Nov. 30, 1926.

J. SACHS 1,608,621

ELECTRICAL CONDUIT SYSTEM

Filed April 26, 1920

Joseph Sachs, Inventor

By his Attorneys

Patented Nov. 30, 1926.

1,608,621

UNITED STATES PATENT OFFICE.

JOSEPH SACHS, OF HARTFORD, CONNECTICUT.

ELECTRICAL CONDUIT SYSTEM.

Application filed April 26, 1920. Serial No. 376,537.

The invention relates to protective conduit systems for electrical wiring and its object is to improve the connection facilities of the boxes.

To this end the invention consists in disposing the knock-outs with which such boxes are commonly provided, in a certain nested relation as explained below and as exemplified in the accompanying drawing.

Figure 1:
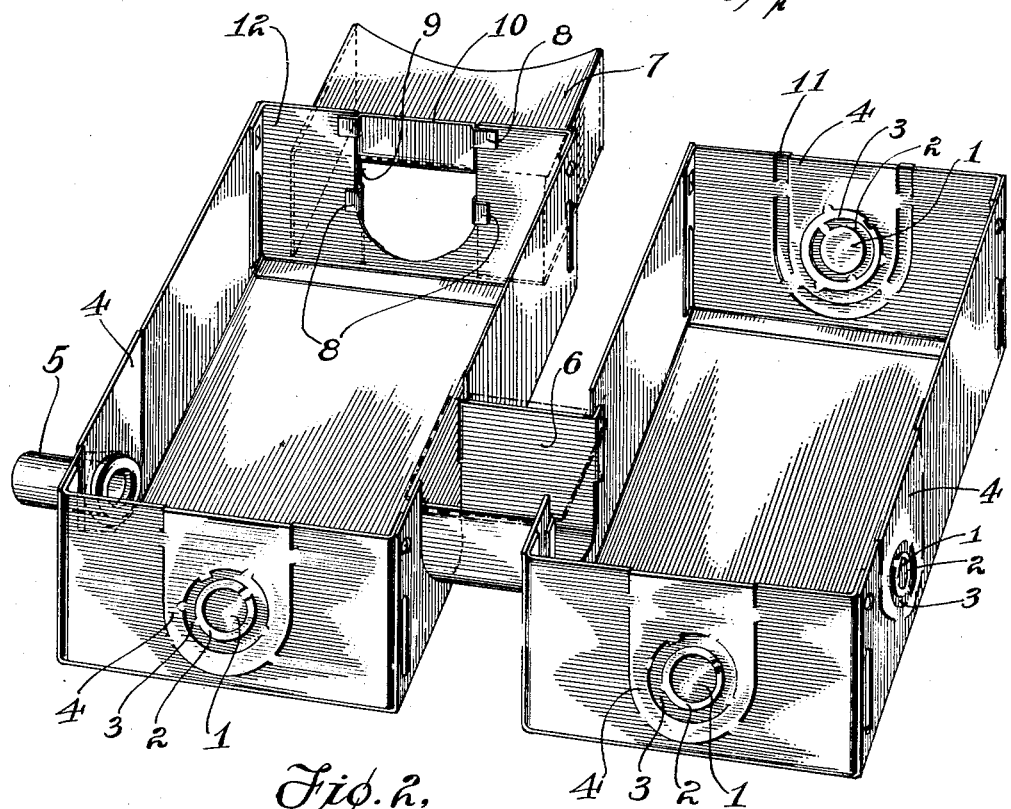
Figure 2:
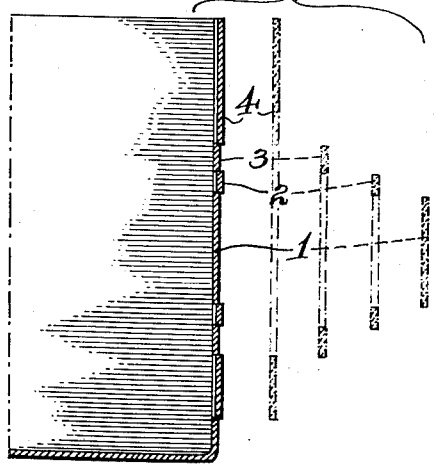

In the drawings, Fig. 1 is a perspective of two adjacent boxes, which are equipped with open and closed side knock-outs shown connected to a variety of conduit members in order to illustrate their diversity of use; and Fig. 2 is a central cross section through the nested assembly, also showing the knock-outs removed.

It will be understood that the knock-outs in electrical equipment of the kind referred to are constituted of sections of the walls of the box, semi-permanently held in place in the body of the wall and adapted to be knocked out as required, for providing openings in which the conduit members are secured. The boxes of Fig. 1 may be assumed to represent ordinary switch or fuse boxes with their switches or fuses or other contents and also their covers, removed for convenience of illustration. According to this invention assemblies of nested knock-outs are formed in the walls of such boxes at the points where knock-outs are commonly located, that is to say, in one or all of the walls which form the box, and each assembly comprises a set or series of two or more knock-out sections, of different sizes, all of them being more or less concentric to each other, the smaller section or sections being circular and closed-side and the larger non-circular or open-side and preferably U-shaped, and each being held in place by some form of separable engagement with, or attachment to, the next larger in the set. Thus, in the left-hand box, the smallest knock-out, marked 1, is a circular disc held in place by peripheral engagement with the next larger (2), which is an annulus, and the latter is similarly held at its periphery in the next larger (3), also an annulus, and this annulus 3 is in turn held in place by engagement with the next larger, which, in the present case is the last of the series and is constituted of an oblong or U-shaped plate concentric with the other sections at one end but extended at its opposite end to the edge of the box wall, thereby forming an open-side knock-out. The knock-out sections may be formed in any way which will result in a line of weakness coinciding with the contour of the section and permitting it to be removed laterally from the wall by the application of considerable force, as by hammering it. Several methods of forming such lines of weakness or semi-permanent attachment are already known to the trade. In the box shown, the knock-outs are produced by partially punching or slightly displacing a part of the metal out of the plane of the box wall so that by the application of sufficient force, one or more of them may be later completely removed, thus leaving an opening in the wall of proper size or shape to receive some desired type or size of conduit member. Before removal each section constitutes in effect a permanent part of the wall and when such conduit member is clamped, as usual, to the margin of the opening thus formed, it is in permanent electrical connection with the body of the box. It thus becomes unnecessary to provide a special electric bond between the box and the conduit for the purpose of providing the required ground for the box. The line of weakness affords the conductive connection to the box wall, because it is not a complete severance. By preference, each successive knock-out section in the series is substantially central and symmetrical to the others and each is punched or partially displaced in opposite directions so that the nested series before removal has the staggered arrangement indicated in Fig. 2, but neither of these conditions is essential.

By knocking out section 1 of any assembly shown, a small round hole is formed suitable for connection with the smallest standard size of armoured cable or conduit tubing and by removing sections 1 and 2, or 1, 2 and 3, larger holes are provided for larger pipe conduits, all as indicated at 5, while by removing the next section 4, a hole is formed extending to the edge of the wall, and which will take either a trough type conduit, as indicated at 6, or an adapter conduit as indicated at 7. This hole is termed an open-side opening while the smaller ones for distinction are called closed-side openings. The trough 6 which is received in the open-side opening is merely a means of connection between adjacent boxes, as illustrated, and consists of a sheet metal blank bent in to open trough shape with terminal flanges or ears adapting it to be set at each end into an open-side hole produced in each box in the manner just indicated. These troughs have the advantage that the wires may be laid in them instead of being threaded through them; they may be covered over in any suitable way, as by means of a cover plate such as indicated by the dotted lines, and they are held in place by the covers of the boxes when the latter are in place and as will be understood. The adapter conduit 7 is for enclosing the passage through which the wiring runs from the interior of the box to some adjacent piece of electrical apparatus such as a house meter, or the like, being a box-like member curved or specially shaped at one end to fit the particular style of meter for which it is intended to be used and provided with one or more lugs or hooks 8 at its other end by means of which it fits and interlocks with the open-side opening in the box wall. Such adapters may obviously be made in a variety of shapes and forms. The one shown has its side walls bent over at the end forming an end wall 9 with a central opening of about the size of the largest knock-out opening and adapted to register therewith. The end of the top or front wall is bent up to form a flange 10 and the interlocking ears 8 are formed integrally on this flange and on the end wall so that the adapter can be slid into the open-side opening of the box wall; when so placed a cover on the box will retain the adapter against removal as in the case of the trough type conduit member. It will be quite apparent that a trough adapter or other conduit member can be connected to the box at any of the places where the knock-out assemblies are located and according to the circumstances of the installation, and that graded sizes of troughs and adapters can readily be used by adding other open-side knock-out sections to the series and as indicated for example by 11 at the right-hand side of Fig. 1, but in that case, as before, the assembly will consist of one or more smaller round hole or closed-side sections and one or more larger U-shape or open-side sections, each having the functions stated and together providing the advantage above briefly alluded to.

Finally, any wall of the box containing one of these composite knock-out assemblies, as for instance the end wall 12, can be bodily removed, if desired, which will not only provide for connection to a still larger adapter (not illustrated) but permits one or more of said composite assemblies or open-side knock-out sections to be formed in the back wall of the box. The flanges on the said wall 12 are notched and slotted to fit corresponding slots or projections on the ends of the longitudinal side walls so as to be held in place thereby but to be capable of removal by spreading the side walls apart. It will be apparent that a box so constructed possesses a high degree of flexibility as to the uses to which it may be put and within the objects of the invention first above stated.

Claims.

1. A switch box having a wall provided with means whereby either a standard trough connector, or a standard pipe connector, can be connected to the same point on said wall, said means comprising nested knockout sections, the largest section forming a semi-permanent part of said wall, held in firm continuous conductive contact therewith by a U-line of weakness and adapted to provide an open-side U-shape opening in said wall extending to the free edge thereof when said line of weakness is ruptured, and a closed-side knockout section formed entirely within the boundary of said U-shape section, said concentric section being held in firm continuous conductive contact with said U-section, also by a line of weakness whereby said nested sections together constitute an imperforate and semi-permanent part of the box wall, substantially as described.

2. A switch box having a wall provided with means whereby either a standard trough connector, or a standard pipe connector, can be attached to the same point on said wall, said means comprising a set of nested knock-out sections, the largest section in the set being partially displaced from the plane of the wall in one direction, to form a semi-permanent part of said wall, and being held in firm continuous conductive contact therewith by a U-line of weakness and adapted to provide an open-side U-shape opening in said wall extending to the free edge thereof when said line of weakness is ruptured, and two closed-side knockout sections formed entirely within the boundary of said U-shape section, said sections being respectively held in close continuous engagement each with the other and said U-section also by lines of weakness and the larger of said concentric sections being partially displaced in the opposite direction from said U-section, and the smaller in the same direction, whereby all of the nested sections constitute a semi-permanent and imperforate portion of the box wall substantially as described.

In testimony whereof, I have signed this specification.

JOSEPH SACHS.